(12) United States Patent
Sakuramoto et al.

(10) Patent No.: US 6,369,945 B1
(45) Date of Patent: Apr. 9, 2002

(54) OPTICAL FILM, OPTICAL MEMBER AND OPTICAL ELEMENT

(75) Inventors: Takafumi Sakuramoto; Minoru Miyatake, both of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/499,757

(22) Filed: Feb. 8, 2000

(30) Foreign Application Priority Data

Feb. 8, 1999 (JP) .................................. 11-029789

(51) Int. Cl.[7] .................................................. G02B 5/30
(52) U.S. Cl. .................. 359/494; 359/495; 359/497; 359/500; 349/86; 349/96
(58) Field of Search .................. 359/494, 495, 359/497, 500; 349/86, 96, 194

(56) References Cited

U.S. PATENT DOCUMENTS

| | | | |
|---|---|---|---|
| 4,688,900 A | | 8/1987 | Doane et al. |
| 5,113,270 A | * | 5/1992 | Fergason ................ 349/165 |
| 5,751,388 A | * | 5/1998 | Larson .................. 349/96 |
| 5,825,543 A | * | 10/1998 | Ouderkirk et al. .......... 359/494 |
| 5,940,211 A | * | 8/1999 | Hikmet et al. ............ 359/492 |

* cited by examiner

*Primary Examiner*—Darren Schuberg
(74) *Attorney, Agent, or Firm*—Sughrue, Mion, Zinn, Macpeak & Seas, PLLC

(57) ABSTRACT

A practical optical film which has excellent anisotropy in the scattering of linearly polarized light, can easily be produced and has excellent thermal stability, and an optical member and an optical element using the optical film, are disclosed. The optical film comprises a birefringent resin film and birefringent minute regions dispersedly contained therein comprising a thermoplastic resin having a glass transition temperature of 50° C. or higher and showing a nematic liquid crystal phase in a range of temperatures lower than the glass transition temperature of the resin constituting the resin film, wherein the difference in refractive index between the resin film and the minute regions in a direction perpendicular to the axis direction in which a linearly polarized light has a maximum transmittance, $\Delta n^1$, is 0.03 or larger and that in the maximum-transmittance axis direction, $\Delta n^2$, is not larger than 50% of the $\Delta n^1$. The optical element comprises a multilayer structure which comprises at least one of a polarizing film and a retardation film and one or more layers of the optical film.

9 Claims, 1 Drawing Sheet

OPTICAL FILM, OPTICAL MEMBER AND OPTICAL ELEMENT

FIELD OF THE INVENTION

The present invention relates to an optical film which has excellent anisotropy in the scattering of linearly polarized light and excellent thermal stability and is suitable for use in improving the perceptibility, brightness, durability, and other performances of liquid-crystal displays and the like. The present invention also relates to an optical member comprising the optical film. The invention further relates to an optical element comprising the optical film.

BACKGROUND OF THE INVENTION

Conventional optical films which comprise a matrix and dispersedly contained therein regions having anisotropy in refractive index and are anisotropic with respect to the scattering of linearly polarized light include a film comprising a combination of a thermoplastic resin and a low molecular weight liquid crystal, a film comprising a combination of a low molecular weight liquid crystal and a photocrosslinkable low molecular weight liquid crystal, a film comprising a combination of a polyester and either an acrylic resin or polystyrene and a film comprising a combination of poly(vinyl alcohol) and a low molecular liquid crystal (see U.S. Pat. No. 2,123,901, WO 87/01822, EP 050617, WO 97/32224, WO 97/41484, and JP-A-9-274108). (The term "JP-A" as used herein means an "unexamined published Japanese patent application".)

The optical films described above are intended to, for example, improve the perceptibility, brightness and other performances of liquid crystal displays or the like based on their polarizing/separating function and light-diffusing function both attributable to their property of anisotropically scattering linearly polarized light. However, the conventional optical films have problems that production thereof is troublesome and they are insufficient in stability required for practical use, such as heat resistance.

SUMMARY OF THE INVENTION

One object of the invention is to provide a practical optical film which has excellent anisotropy in the scattering of linearly polarized light, can be easily produced, and has excellent thermal stability.

Another object of the invention is to provide an optical member comprising the optical film.

Further object of the invention is to provide an optical element comprising the optical film.

The optical film according to the invention comprises a birefringent resin film and birefringent minute regions dispersedly contained therein, wherein the minute regions comprise a thermoplastic resin having a glass transition temperature of 50° C. or higher and showing a nematic liquid crystal phase in a range of temperatures lower than the glass transition temperature of the resin constituting the resin film, and the difference in refractive index between the resin film and the minute regions in a direction perpendicular to the axis direction in which a linearly polarized light has a maximum transmittance, $\Delta n^1$, is 0.03 or larger and that in the maximum-transmittance axis direction, $\Delta n^2$, is 50% or smaller of the $\Delta n^1$.

The optical member according to the present invention comprises two or more layers of the optical film which are superposed such that the $\Delta n^1$ directions for any of the layers are parallel to those for the adjacent layers.

The optical element according to the present invention comprises a multilayer structure which comprises at least one of a polarizer plate and a retardation film and one or more layers of the optical film described above.

The optical film according to the present invention has the following excellent anisotropy in scattering. In the axis direction in which a linearly polarized light has a maximum transmittance ($\Delta n^2$ direction), the linearly polarized light passes through the optical film while satisfactorily retaining its polarized state. In directions ($\Delta n^1$ directions) perpendicular to the $\Delta n^2$ direction, the linearly polarized light is scattered based on the difference in refractive index $\Delta n^1$ between the resin film and the minute regions, whereby the polarized state is diminished or eliminated.

Furthermore, since the minute regions and the film dispersedly containing the same are formed from resins having excellent handleability, the optical film can be easily produced. The optical film obtained has excellent thermal stability, stably retains its optical functions over long, and has excellent suitability for practical use. According to the present invention, an optical film which undergoes no change in appearance or optical properties, e.g., scattering properties, even at temperatures as high as 80° C. or above can be formed.

As a result, the optical film can be used to obtain a liquid-crystal display in which light loss by absorption and heat generation by light absorption can be prevented based on the polarizing properties of the optical film attributable to anisotropy in scattering, and which is excellent not only in abrightness and perceptibility but in the thermal stability of optical functions due to the satisfactory heat resistance of the optical film and has heat resistance sufficient for practical use.

1, 11, 13, 15, 17: optical film e: minute region

2: adhesive layer

3: optical part

DETAILED DESCRIPTION OF THE INVENTION

The optical film according to the present invention comprises a birefringent resin film and birefringent minute regions dispersedly contained therein, wherein the minute regions comprise a thermoplastic resin having a glass transition temperature of 50° C. or higher and showing a nematic liquid crystal phase in a range of temperatures lower than the glass transition temperature of the resin constituting the resin film, and the difference in refractive index between the resin film and the minute regions in a direction perpendicular to the axis direction in which a linearly polarized light has a maximum transmittance, $\Delta n^1$, is 0.03 or larger and that in the maximum-transmittance axis direction, $\Delta n^2$, is 50% or smaller of the $\Delta n^1$.

Figure 1:
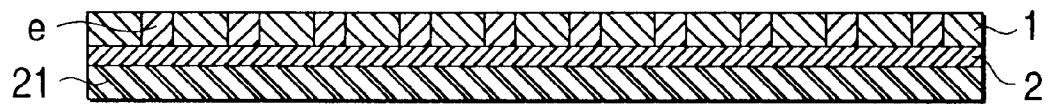
FIG. 1 is a sectional view of one embodiment of the optical film.

An embodiment of the optical film is shown in FIG. 1, wherein numeral 1 is the optical film and "e" denotes a birefringent minute region. Numeral 2 denotes an adhesive layer consisting of a pressure-sensitive adhesive layer for bonding the optical film to an adherend, and 21 denotes a separator provisionally covering the pressure-sensitive adhesive layer.

For forming the optical film, the following method can, for example, be used. One or more resins for forming a birefringent film are mixed with one or more liquid crystalline thermoplastic resins described above for forming minute regions. From this mixture is formed a birefringent resin film dispersedly containing the thermoplastic resins as minute regions. Thereafter, the thermoplastic resins constituting the minute regions are heated to bring the same into a nematic liquid crystal phase, and this alignment is fixed by cooling.

The resins for forming a birefringent resin film are not particularly limited, and suitable transparent resins which show orientational birefringence can be used. Examples thereof include carbonate resins, polyethersulfone resins, arylate resins, polyester resins, amide resins, imide resins, sulfone resins, polyetheretherketone resins, poly(phenylene sulfide) resins, vinyl butyral resins, polyoxymethylene resins and blends of these.

Preferred resins from the standpoints of the property of developing orientational birefringence and transparency are those which have an intrinsic birefringence Ano satisfying $|\Delta n^051| > 0.01$ and are highly transparent in the visible region. Preferred resins from the standpoint of heat resistance are those having a deformation-under-load temperature of 80° C. or higher and a glass transition temperature of 110° C. or higher, preferably 115° C. or higher, more preferably 120° C. or higher. From these standpoints and from the standpoints of film strength, handleability, etc., preferred resins include carbonate resins, polyethersulfone resins, and arylate resins. The deformation-under-load temperature is measured in accordance with JIS K 7207 through a test in which a test piece having a height of 10 mm placed in a heating bath is heated by heating the heating medium at a rate of 2° C./min while imposing a bending stress of 18.5 kgf/cm² on the test piece. The deformation-under-load temperature of the test piece is defined as the temperature of the heating medium at the time when the amount of deflection of the test piece has reached 0.32 mm.

On the other hand, the thermoplastic resin used for forming the minute regions is one having a glass transition temperature of 50° C. or higher and showing a nematic liquid crystal phase in a range of temperatures lower than the glass transition temperature of the resin constituting the resin film. The kind thereof is not particularly limited, and an appropriate liquid crystal polymer of the main chain or side chain type or another type having those properties can be used. However, liquid crystal polymers having a degree of polymerization of 8 or higher, preferably from 12 to 2,000, are preferred from the standpoints of forming minute resins having uniformity in particle diameter and of thermal stability of the minute regions. Examples thereof include side chain type liquid crystal polymers having monomer units represented by the following general formula.

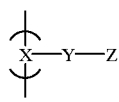

wherein X is a backbone group which constitutes the main chain of the liquid crystal polymer and may be formed by appropriate linkage groups such as linear, branched or cyclic groups. Examples thereof include polyacrylates, polymethacrylates, poly (α-haloacrylate) s, poly ((α-cyanoacrylate) s, polyacrylamides, polyacrylonitriles, polymethacrylonitriles, polyamides, polyesters, polyurethanes, polyethers, polyimides and polysiloxanes.

Y is a spacer group branching from the main chain. From the standpoint of forming an optical film while regulating refractive index and from other standpoints, preferred examples of the spacer group Y include ethylene, propylene, butylene, pentylene, and hexylene. Especially preferred of these is ethylene.

On the other hand, Z is a mesogenic group imparting the property of nematic orientation. Examples thereof include the following groups.

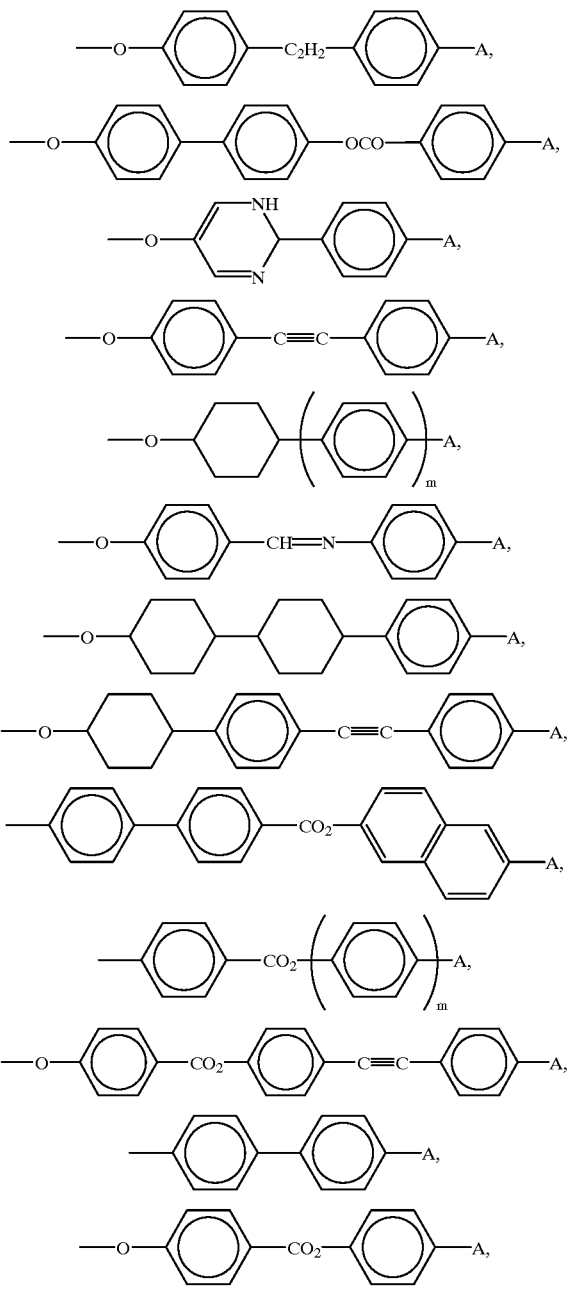

-continued

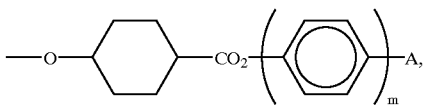

The terminal substituent A in the groups shown above may be an appropriate substituent such as a cyano, alkyl, alkenyl, alkoxy or oxaalkyl group or an alkyl, alkoxy or alkenyl group in which one or more of the hydrogen atoms are replaced with fluorine or chlorine atoms.

In the monomer units described above, the spacer group Y and the mesogenic group Z may be bonded through an ether bond, —O—. Furthermore, in the phenyl groups contained in the mesogenic group Z, one or two hydrogen atoms may be replaced with a halogen. In this case, the halogen is preferably chlorine or fluorine.

The side chain type liquid crystal polymers undergoing nematic orientation may be any appropriate thermoplastic resins such as homo- or copolymers having monomer units represented by the general formula described above. Preferred among these polymers are those excellent in monodomain orientation.

The optical film is formed by using, in combination, a resin for forming a birefringent resin film and a thermoplastic resin which shows a nematic liquid crystal phase in a range of temperatures lower than the glass transition temperature of the resin for forming a birefringent resin film and has a glass transition temperature of 50° C. or higher, preferably 60° C. or higher, more preferably 70° C. or higher. The two resins are preferably used in such a combination as to undergo phase separation from the standpoint of the even distribution of minute regions in the optical film to be obtained. The distribution of minute regions can be regulated by selecting a combination of resins having a suitable degree of compatibility. Phase separation can be accomplished by a suitable technique such as a method in which incompatible materials are dissolved in a solvent to prepare a solution thereof or a method in which incompatible materials are melt-mixed with each other with heating.

The birefringent resin film dispersedly containing a liquid crystalline thermoplastic resin as minute regions, i.e., the film to be oriented, can be obtained by an appropriate technique such as casting, extrusion molding, injection molding, rolling or flow casting. It is also possible to obtain the film by spreading a monomer mixture and polymerizing the spread mixture by heating, irradiation with a radiation such as ultraviolet ray. From the standpoint of obtaining an optical film containing highly evenly distributed minute regions and from other standpoints, a preferred method is to use a solution of a mixture of resins in a solvent to form a film therefrom through casting, flow casting or another technique.

In the case described above wherein a film is formed by casting, flow casting or another technique, the size and distribution of minute regions can be regulated by changing the kind of the solvent, viscosity of the resin mixture solution, rate of drying of the spread resin mixture solution layer, etc. For example, an advantageous technique for reducing the area of minute regions is to use a resin mixture solution having a reduced viscosity or to dry a spread resin mixture solution layer at an increased rate. Although birefringence is usually imparted to the resin film, for example, as a result of molecular orientation which occurs during the film formation described above, a conventional orientation technique such as stretching may be conducted according to need to impart or regulate birefringence.

The thickness of the film to be oriented can be suitably determined. However, from the standpoints of suitability for orientation and others, the thickness thereof is generally from 1 μm to 3 mm, preferably from 5 μm to 1 mm, more preferably from 10 to 500 μm. In forming the film, appropriate additives can be incorporated, such as a dispersant, surfactant, ultraviolet absorber, color tone regulator, flame retardant, release agent or antioxidant.

The orientation treatment of minute regions can be accomplished by, for example, a method comprising heating the resin film to a temperature at which the liquid crystalline thermoplastic resin dispersedly contained therein as minute regions melts and shows a nematic phase, orienting the molecules of the liquid crystalline resin under the influence of an orientation-regulating force, and then rapidly cooling the film to fix the oriented state. Preferably, this oriented state is as close as possible to a monodomain state, for example, from the standpoint of eliminating fluctuations of optical properties.

The orientation-regulating force used can be an appropriate force capable of orienting the liquid crystalline thermoplastic resin. Examples thereof include a stretching force which is applied by stretching the resin film in an appropriate stretch ratio at a temperature not higher than the heat deformation temperature, generally not higher than the glass transition temperature, of the resin constituting the birefringent resin film, and further include a shearing force applied during film formation, an electric field and a magnetic field. One or more of such orientation-regulating forces can be used to orient the liquid crystalline thermoplastic resin.

The optical film according to the present invention is regulated in refractive index differences, $\Delta n^1$ and $\Delta n^2$, between the birefringent resin film matrix and the liquid crystalline thermoplastic resin constituting the minute regions. Specifically, the refractive index difference between the two resins in a direction perpendicular to the axis direction in which a linearly polarized light has a maximum transmittance ($\Delta n^1$) is 0.03 or larger, and that in the maximum-transmittance axis direction ($\Delta n^2$ is 50% or smaller of the $\Delta n^1$. By regulating the optical film so as to have such differences in refractive index, the film can have the excellent ability to scatter light in $\Delta n^1$ directions and, in the $\Delta n^2$ direction, it has the excellent ability to maintain a polarized state and enable the light to pass therethrough without being deflected.

From the standpoints of scattering properties and others, it is preferred that the difference in refractive index in a $\Delta n^1$ direction, $\Delta n^1$, be moderately large. Specifically, the refractive index difference $\Delta n^1$ is preferably from 0.04 to 1, more preferably from 0.045 to 0.5. On the other hand, from the standpoints of maintaining a polarized state and other standpoints, it is preferred that the difference in refractive index in the $\Delta n^2$ direction, $\Delta n^2$, be as small as possible. Specifically, the refractive index difference $\Delta n^2$ is preferably 0.03 or smaller, more-preferably 0.02 or smaller, most preferably 0.01 or smaller.

Consequently, the orientation treatment of the minute regions can be regarded as a treatment in which the molecules of the liquid crystalline thermoplastic resin constituting the minute regions are oriented in a given direction as correctly as possible to thereby increase the $\Delta n^1$-direction refractive index difference, or reduce the $\Delta n^2$-direction refractive index difference, or attain both.

From the standpoint of attaining the requirement concerning refractive index differences, it is therefore advantageous, in forming the optical film, to use a resin for forming a birefringent resin film and a liquid crystalline thermoplastic resin for forming minute regions in such a combination that the refractive index of the former resin is as close as possible to the refractive index of the latter resin with respect to ordinary rays and differs considerably from the refractive index of the latter resin with respect to extraordinary rays.

In the optical film, the minute regions are preferably dispersed and distributed as evenly as possible from the standpoints of homogeneity of the scattering effect, etc. The size of the minute regions, especially the length thereof in $\Delta n^1$ directions, which are directions of scattering, relates to backward scattering (reflection) and wavelength dependence. From the standpoints of improving the efficiency of light utilization, preventing coloration due to wavelength dependence, preventing the minute regions from being visually perceived to reduce perceptibility or impair bright displaying, and attaining satisfactory film-forming properties, film strength, etc., the size of the minute regions in terms of $\Delta n^1$-direction length is preferably from 0.05 to 500 $\mu$m, more preferably from 0.1 to 250 $\mu$m, most preferably from 1 to 100 $\mu$m. The $\Delta n^2$-direction length of the minute regions, which are present usually as domains in the optical film, is not particularly limited.

Although the proportion of the minute regions in the optical film can be suitably determined from the standpoints of $\Delta n^1$-direction scattering and others, it is generally from 0.1 to 70% by weight, preferably from 0.5 to 50% by weight, more preferably from 1 to 30% by weight, from the standpoint of further attaining other properties including satisfactory film strength.

Figure 2:
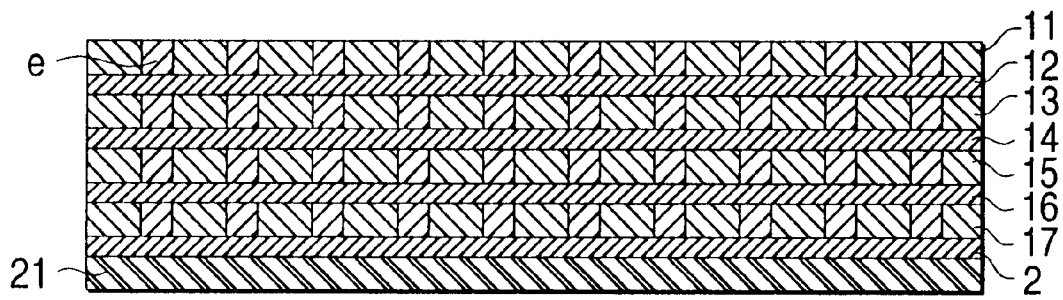
FIG. 2 is a sectional view of another embodiment of the optical film.

The optical film according to the present invention may be used as a single layer 1 as shown in FIG. 1. Alternatively, two or more layers of the optical film may be superposed on each other and used as an optical member. An example of the optical member is shown in FIG. 2, wherein numerals 11, 13, 15, and 17 each denotes an optical film and 12, 14, and 16 each denotes an adhesive layer.

The superposition of optical films can bring about a synergistic scattering effect higher than the scattering effect expected from the thickness increase. The optical member may be obtained by superposing optical films while positioning each film at any desired angle with respect to the $\Delta n^1$ or $\Delta n^2$ direction. However, from the standpoints of enhancing the scattering effect, etc., it is preferred to superpose the films in such a manner that the $\Delta n^1$ directions for any film layer are parallel to those for the adjacent layers. The number of superposed optical films can be appropriate number of 2 or larger.

The optical films to be superposed may have the same or different values of $\Delta n^1$ or $\Delta n^2$. With respect to the parallelism in, e.g , $\Delta n^1$ direction between adjacent layers, fluctuations of parallelism caused by operational errors are allowable, although a higher degree of parallelism is preferred. In the case of a layer having fluctuations in, e.g., $\Delta n^1$ direction, the parallelism is based on the average of these.

The optical films in the optical member may be in a merely stacked state. It is, however, preferred that the optical films are bonded each other through an adhesive layer or the like from the standpoints of preventing film shifting in, e.g., $\Delta n^1$ directions and preventing foreign substances from coming into each interface and from other standpoints. For the bonding, an appropriate adhesive can be used, such as a hot-melt or pressure-sensitive adhesive. From the standpoint of diminishing reflection loss, an adhesive layer whose refractive index is as close as possible to that of the optical films is preferred. It is also possible to bond optical films with the same resin as either of the resins constituting the optical films.

The optical film and the optical member according to the invention can be used in various applications intended to form or regulate a polarized light, such as a polarizing film, based on their property of transmitting/scattering a linearly polarized light. For example, where the optical film or optical member is used in or as a polarizing film, it has an advantage of being less apt to heat up or deteriorate because it differs from dichroic absorption type polarizing films and the like in the principle of polarized-light formation and is hence less apt to absorb light, as stated hereinabove. Furthermore, the optical film and optical member have the possibility of improving the efficiency of light utilization when the light scattered by the optical film or optical member is reused after having been converted to a polarized light with another optical part.

Figure 3:
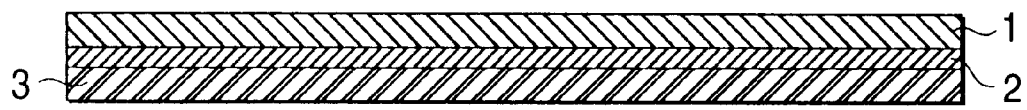
FIG. 3 is a sectional view of one embodiment of the optical element.

Consequently, the optical film or optical member according to the present invention may practically be also used as an optical element which comprises a multilayer structure formed by disposing one or more layers of the optical film or optical member on one or each side of an appropriate optical part, e.g., a polarizing film and/or a retardation film. An example of the optical element is shown in FIG. 3, wherein numeral 3 denotes an optical part. In this multilayer structure, the components may be in a merely stacked state or may have been bonded each other through an adhesive layer or the like. With respect to this adhesive layer, the same explanation can be given as in the superposition of optical films.

There are no particular limitations on the optical parts which may be superposed, and appropriate parts may be used. Examples thereof include a polarizing film, a retardation film, a backlight such as a light guide plate, a reflector plate, a polarizing separator plate comprising, e.g., amultilayered film, and a liquid crystal cell. Such optical parts, including a polarizing film and a retardation film, may be any of various types.

Specifically, examples of the polarizing film include absorption type, reflection type, and scattering type polarizing films, while examples of the retardation film include a quarter-wavelength plate, a half-wavelength plate, a retardation film comprising a uni- or biaxially or otherwise stretched film, one comprising a film which has undergone inclined orientation, i.e., which has undergone molecular orientation also in the thickness direction, one comprising a liquid crystal polymer, one in which a phase difference caused by a viewing angle or birefringence is compensated for, and one comprising two or more of these retardation films superposed on each other. Any of these can be used in the present invention.

Specific examples of the polarizing film include absorption type polarizing films obtained by adsorbing iodine or a dichroic substance, e.g., a dichroic dye, onto a hydrophilic polymer film, such as a poly(vinyl alcohol) film, a film of poly(vinyl alcohol) which has undergone partial conversion into formal, or a film of a partially saponified ethylene/vinyl acetate copolymer, and then stretching the film. Examples thereof further include oriented polyene films such as a film of dehydrated poly (vinyl alcohol) and a film of dehydrochlorinated poly (vinyl chloride).

Examples of the polarizing film still further include a polarizing film comprising any of the aforementioned polarizing films and a transparent protective layer formed on one or each side thereof for the purpose of protection against water, etc. The protective layer may be, for example, a coating layer of a plastic or a laminated film layer. The transparent protective layer may contain fine transparent particles having an average particle diameter of, e.g., from 0.5 to 5 μm so as to impart fine roughness to the surface of the polarizing film. Examples of such particles include fine inorganic particles which may be electroconductive, such as silica, alumina, titania, zirconia, tin oxide, indium oxide, cadmium oxide and antimony oxide particles, and fine organic particles made of a crosslinked or uncrosslinked polymer.

On the other hand, specific examples of the retardation film include stretched films made of any of the resins enumerated hereinabove with regard to the optical film or made of a liquid crystal polymer especially of the twisted alignment type.

Furthermore, examples of the light guide plate include one which comprises a transparent resin plate and, disposed by a side edge thereof, either a line light source such as a (cold or hot) cathode tube or a light source such as one or more light-emitting diodes or ELs and has a structure such that the light transmitted by the resin plate is emitted from one side of the plate through diffusion, reflection, diffraction, interference, etc.

In fabricating an optical element containing a light guide plate, there can be used a suitable combination of the light guide plate with one or more auxiliary means disposed according to need in predetermined positions, e.g., on the upper or lower surface of the light guide plate or at a side edge thereof. Examples of such auxiliary means include a prism array layer which comprises a prism sheet or the like and is used to control the direction of light emission, a diffuser plate for obtaining even illumination, and a light source holder for introducing the light emitted by a line light source into a side edge of the light guide plate.

The multilayer structure contained in or constituting the optical element according to the present invention may contain one optical part or two or more optical parts. The multilayer structure may be one containing two or more optical parts of the same kind, e.g., retardation films. In this case, these optical parts of the same kind, e.g., retardation films, may have the same or different properties. In the optical element, the optical film or optical member may be disposed in one or more appropriate positions outside or within the multilayer structure, e.g., on one or each outer side of the multilayer structure or on one or each side of an optical part contained in the multilayer structure.

Where the optical element contains a polarizing film, this polarizing film and the optical film or optical member are preferably disposed in such positions that the $\Delta n^1$ or $\Delta n^2$ direction for the optical film or optical member is parallel to the transmission axis of the polarizing film, from the standpoint of effectively utilizing the transmitting/scattering properties of the optical film and from other standpoints. With respect to this parallelism, the same explanation can be given as in the case of superposing optical films described hereinabove.

In the optical element in which the $\Delta n^1$ directions for the optical film or optical member are parallel to the transmission axis of the polarizing film, a linearly polarized light which has passed through the polarizing film can be scattered by the optical film or optical member in the $\Delta n^1$ directions therefor. Consequently, when this optical element is applied to, for example, a liquid crystal display in such a manner that the optical element is disposed on the viewing side, with the polarizing film facing the liquid crystal cell, then it is effective in widening the viewing angle.

On the other-hand, in the optical element in which the $\Delta n^2$ direction for the optical film or optical member is parallel to the transmission axis of the polarizing film, a linearly polarized light absorbable by the polarizing film can be scattered by the optical film or optical member in the $\Delta n^1$ directions therefor. Consequently, when this optical element is disposed, for example, in such a manner that light enters the optical film or optical member before entering the polarizing film, then it is effective in increasing the amount of light passing through the polarizing film.

The present invention is described in more detail by reference to the following Examples, but it should be understood that the invention is not construed as being limited thereto.

EXAMPLE 1

In a 20 wt % dichloromethane solution containing 950 parts (parts by weight; hereinafter the same) of a polycarbonate having a deformation-under-load temperature of 135° C. and a glass transition temperature of 145° C. was dissolved 50 parts of a liquid crystalline thermoplastic resin represented by the following formula which had a glass transition temperature of 70° C. and showed a nematic liquid crystal phase in the temperature range of from 100 to 300° C. From this solution was obtained a 100 μm thick film by casting. This film was stretched at 150° C. in a stretch ratio of 2 and then rapidly cooled to obtain an optical film having refractive index differences $\Delta n^1$ and $\Delta n^2$ of 0.140 and 0.05, respectively.

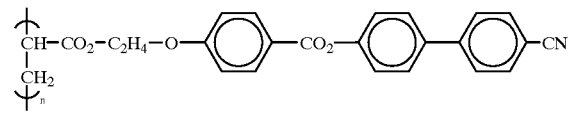

The optical film obtained above composed of a birefringent film made of the polycarbonate and the liquid crystalline thermoplastic resin dispersed therein as domains of almost the same shape elongated along the stretch direction. The average diameter of these domains was determined through an examination with a polarizing microscope based on coloration by phase difference. As a result, the $\Delta n^1$-direction length thereof was found to be 5 μm.

EXAMPLE 2

The optical film obtained in Example 1 was bonded to a commercial polarizing film having a total light transmittance of 41% and a degree of transmitted-light polarization of 99% with an acrylic pressure-sensitive adhesive layer having a thickness of 20 μm so that $\Delta n^1$ directions coincided with the transmission axis. Thus, an optical element was obtained.

COMPARATIVE EXAMPLE 1

In an 18 wt % dichloromethane solution containing 300 parts of poly(methyl methacrylate) having a deformation-under-load temperature of 65° C. and a glass transition temperature of 80° C. was dissolved 100 parts of a cyano, nematic, low molecular weight liquid crystal which had a glass transition temperature not higher than room temperature and showed a liquid crystal phase in the temperature range of from 20 to 78° C. (GR-41, manufactured by Chisso Corp.). From this solution was obtained a 60 μm-thick film by casting. This film was stretched at room temperature in a stretch ratio of 1.2 to obtain an optical film having refractive index differences $\Delta n^1$ and $\Delta n^2$ of 0.20 and 0.007, respectively.

The optical film obtained above composed of a film made of the poly(methyl methacrylate) and the cyano, nematic, low molecular weight liquid crystal dispersed therein as domains of irregular shapes. Because of this, the size of the domains was determined in the following manner. First, the angle dependence of the intensity of scattered light was determined with a gonio photometer. The results obtained were fitted into wave optics simulation results for scattering by uniform particles to approximate the size of the domains through a calculation. As a result, the $\Delta n^1$-direction length of the domains was found to be about 1 μm.

COMPARATIVE EXAMPLE 2

The optical film obtained in Comparative Example 1 was bonded to a commercial polarizing film having a total light transmittance of 41% and a degree of transmitted-light polarization of 99% with an acrylic pressure-sensitive adhesive layer having a thickness of 20 pm so that the $\Delta n^2$ direction coincided with the transmission axis. Thus, an optical element was obtained.

EVALUATION TEST 1

With respect to each of the optical films obtained in Example 1 and Comparative Example 1, a light polarized parallel or perpendicularly to the stretch direction was caused to strike thereon at room temperature or 90° C. to visually examine the light for scattering. Furthermore, a light polarized parallel or perpendicularly to the stretch direction was caused to strike on each optical film at room temperature to measure the haze with a haze-meter according to ASTM D1003-61. The results obtained are shown in the Table below. The results of the 90° C. examination for scattering are given in parentheses.

TABLE

|  | Scattering | | Haze | |
| --- | --- | --- | --- | --- |
|  | Parallel direction | Perpendicular direction | Parallel direction | Perpendicular direction |
| Example 1 | scattered (scattered) | transmitted (transmitted) | 55 | 10 |
| Comparative Example 1 | scattered (transmitted) | transmitted (transmitted) | 63 | 12 |

The above Table shows that each optical film has anisotropy such that scattering properties change depending on the direction of polarization. The Table further shows that the optical film of Example 1 satisfactorily retains the anisotropy even at high temperature, whereas the optical film of Comparative Example 1 does not show the anisotropy at high temperature.

EVALUATION TEST 2

The optical elements obtained in Example 2 and Comparative Example 2 and a commercial iodine-containing polarizing film were placed close to the light-emitting lens of a projector lamp (metal halide lamp, 250 W). The optical elements were disposed such that their optical film side faced the lamp. The optical elements and the commercial polarizing film were thus irradiated for 300 hours in total and then visually examined for any change. As a result, the commercial polarizing film had suffered a considerable color change into red and had deteriorated to a level unsuitable for use, and the optical element of Comparative Example 2 also suffered a color change and a considerable deformation. In contrast, almost no change was observed in the optical element of Example 2.

The results obtained above demonstrates that the optical film and the optical element according to the present invention not only show enhanced anisotropy in the scattering of linearly polarized incident light depending on the direction of polarization, but have excellent thermal stability. The optical film and optical element, when applied to liquid crystal displays and the like, are hence expected to improve the perceptibility, brightness, durability and other performances thereof.

What is claimed is:

1. An optical film comprising a birefringent resin film and birefringent minute regions dispersedly contained therein, wherein said minute regions comprise a thermoplastic resin having a glass transition temperature of 50° C. or higher and showing a nematic liquid crystal phase in a range of temperatures lower than the glass transition temperature of the resin constituting the resin film, and the difference in refractive index between the resin film and the minute regions in a direction perpendicular to the axis direction in which a linearly polarized light has a maximum transmittance, $\Delta n^1$, is 0.03 or larger and that in said maximum-transmittance axis direction, $\Delta n^2$, is 50% or smaller of the $\Delta n^1$.

2. The optical film as claimed in claim 1, wherein said minute regions dispersedly contained are formed by phase separation.

3. The optical film as claimed in claim 1, wherein said minute regions have a $\Delta n^1$-direction length of from 0.05 to 500 μm.

4. The optical film as claimed in claim 1, wherein said minute regions have a $\Delta n^1$-direction length of from 1 to 100 μm.

5. The optical film as claimed in claim 1, wherein said resin film comprises a resin having a deformation-under-load temperature of 80° C. or higher and a glass transition temperature of 110° C. or higher.

6. The optical film as claimed in claim 1, wherein said thermoplastic resin showing a nematic liquid-crystal phase is a liquid crystal polymer having a degree of polymerization of 8 or higher.

7. An optical member comprising two or more layers of the optical film as claimed in claim 1, which are superposed such that the $\Delta n^1$ directions for any of the layers are parallel to those for the adjacent layers.

8. An optical element comprising a multilayer structure which comprises at least one of a polarizing film and a retardation film and one or more layers of the optical film as claimed in claim 1.

9. The optical element as claimed in claim 8, which has the polarizing film whose axis of transmission is parallel to the $\Delta n^1$ directions or $\Delta n^2$ direction for the optical film.

* * * * *